(12) United States Patent
Ostermann

(10) Patent No.: US 11,097,503 B2
(45) Date of Patent: Aug. 24, 2021

(54) ROUND BALER

(71) Applicant: DEERE & COMPANY, Moline, IL (US)

(72) Inventor: Philippe Ostermann, Dijon (FR)

(73) Assignee: DEERE & COMPANY, Moline, IL (US)

(*) Notice: Subject to any disclaimer, the term of this patent is extended or adjusted under 35 U.S.C. 154(b) by 332 days.

(21) Appl. No.: 16/253,320

(22) Filed: Jan. 22, 2019

(65) Prior Publication Data

US 2019/0224934 A1 Jul. 25, 2019

(30) Foreign Application Priority Data

Jan. 23, 2018 (EP) ..................................... 18152978

(51) Int. Cl.
*A01F 15/07* (2006.01)
*B30B 9/30* (2006.01)
*A01F 15/08* (2006.01)

(52) U.S. Cl.
CPC ............ *B30B 9/3057* (2013.01); *A01F 15/07* (2013.01); *A01F 15/085* (2013.01); *A01F 15/0841* (2013.01); *B30B 9/3007* (2013.01)

(58) Field of Classification Search
CPC .... A01F 15/07; A01F 15/085; A01F 15/0841; B30B 9/3007; B30B 9/3057
USPC ..................................................... 100/88, 89
See application file for complete search history.

(56) References Cited

U.S. PATENT DOCUMENTS

| | | | |
|---|---|---|---|
| 6,973,779 B2* | 12/2005 | Naaktgeboren ........ | A01B 63/32 60/328 |
| 7,386,967 B2* | 6/2008 | Guthmann .......... | A01F 15/0715 100/100 |
| 7,451,693 B2* | 11/2008 | Rota ........................ | A01F 15/07 100/177 |
| 8,807,023 B2* | 8/2014 | Biziorek ................. | A01F 15/18 100/87 |
| 2003/0006075 A1* | 1/2003 | Arnold .................... | A01B 51/04 180/53.6 |

FOREIGN PATENT DOCUMENTS

| | | |
|---|---|---|
| EP | 1205102 A2 | 5/2002 |
| EP | 1273218 A1 | 1/2003 |
| WO | 2011012955 A1 | 2/2011 |
| WO | 2016005323 A1 | 1/2016 |

OTHER PUBLICATIONS

European Search Report issued in counterpart application No. 18152978.5 dated Jun. 13, 2018. (6 pages).

* cited by examiner

*Primary Examiner* — Jimmy T Nguyen

(57) ABSTRACT

A baler for forming a pressed bale includes a baling chamber and a press mounted within the baling chamber. The press is operable in a bale formation cycle, where the bale formation cycle includes bale formation cycle parameters. A primary power source is operably coupled with the press to transmit a power to the press, and an auxiliary power source is coupled to the press. The auxiliary power source is operable in a power transmitting mode to transmit an auxiliary power to the press. A controller is electrically coupled to the auxiliary power source such that the controller is configured for controlling operation of the auxiliary power source. The operation of the auxiliary power source is operably controlled manually or by the controller according to the bale formation cycle parameters.

11 Claims, 3 Drawing Sheets

ROUND BALER

RELATED APPLICATIONS

This application claims priority to European Patent Application Ser. No. 18152978.5, filed Jan. 23, 2018, the disclosure of which is hereby incorporated by reference in its entirety.

FIELD OF THE DISCLOSURE

The present disclosure relates to a round baler for forming pressed bales, and in particular to an arrangement for pressing the bales without compromising on the baler vehicle speed.

BACKGROUND

A baler includes a baling chamber where the agricultural residues from the farm are collected for binding and forming bales. The baler includes a plurality of press rolls which are transversely positioned within the baler. The press rolls are powered by a Power Take Off (PTO) shaft receiving torque from the engine of a vehicle for pulling the baler. Typically, the bales are bound or wrapped inside the bale forming chamber before being discharged on the ground. The binding operation/wrapping operation is typically carried out by wrapping a twine or a net around the exterior of the bale.

During bale formation, the agricultural residues in the bale forming chamber are required to be effectively pressed by the press rolls during a bale formation cycle. The PTO transmits the power required to operate the press rolls for applying pressure for compressing the crop residues in the bale forming chamber. However, the amount of pressure required to be applied for compressing the crop residue is low in the initial part of the bale formation cycle while the pressure required to be applied by the press rolls towards the end of the bale formation cycle is substantially high. Thus, there is a low pressure and a high pressure sequence during the bale formation cycle. During the high pressure sequence, a peak of power consumption takes place which may require the vehicle to slow down. Further, due to crop accumulation in the pickup area, plugging of crop may take place which would also lead to increased power demand.

Currently, in order to cater to the bale formation cycle during the high pressure sequence or plugging, the operator is required to slow down the baler to ensure maximum power supply is provided to the PTO. However, the slowing down of the machine adversely impacts the operational time of the baler which in turn impacts performance.

Hence, there is a need for a round baler with an arrangement to eliminate the requirement to slow down the vehicle while ensuring increased power supply.

SUMMARY

The present disclosure relates to a round baler comprising a baling chamber, press means mounted within the baling chamber and operable in a bale formation cycle. A primary power source functionally communicates with said press means to transmit a power to the press means. Particularly, the present disclosure relates to an arrangement for pressing the bales without compromising on the baler vehicle speed.

In one embodiment of the present disclosure, a baler includes an auxiliary power source connectable with a press means. The auxiliary power source is operable in a power transmitting mode to transmit an auxiliary power to the press means. The baler further includes control means for controlling operation of the auxiliary power source, wherein, the operation of the auxiliary power source is controlled manually or corresponding to bale formation cycle parameters.

The bale formation cycle includes at least one low pressure sequence in a first part of the bale formation cycle and a high pressure sequence in a second part of the baling formation cycle. The high pressure sequence may be followed by further low pressure sequences. In the first part of the bale formation cycle, the crop residue initiates to enter the bale formation chamber for being formed into a bale.

The bale formation cycle parameter may include an end of the at least one low pressure sequence or a beginning of the high pressure sequence. The bale formation cycle parameter may include an instant of time between the low pressure sequence and the high pressure sequence. The bale formation cycle parameter may include a plugging indication during the bale forming cycle. The plugging indication may be provided by sensors which monitor the crop intake or the rotation of a respective pick-up device.

The bale formation cycle parameters may include one or more of a cycle time, an instant of the cycle time, pressure on the press means, bale density, crop inflow, gate movement, crop parameter, bale dimension and user defined input.

The press means may include a belt, a chain or rolls which are associated with respective drive arrangements driven by a Power Take off shaft.

The auxiliary power source may be supplied with power by a power storage source. The auxiliary power source may particularly include a hydraulic motor powered by a hydraulic source. Alternatively, the auxiliary power source may be provided by a secondary mechanical drive arrangement powered by the Power Take off shaft and selectively connectable to a clutch arrangement.

The hydraulic source may include a hydraulic accumulator connectable to a hydraulic pump and the hydraulic motor. The hydraulic accumulator is operable in a charging phase and a discharging phase. The fluid required to charge the hydraulic accumulator may be supplied from a fluid reservoir connected to the hydraulic pump, which in turn may be located in the baler or a towing vehicle for the baler.

The hydraulic accumulator is charged in the charging phase by the hydraulic pump, during the low pressure sequence through a first directional control valve. The first directional control valve may include a solenoid operated valve or a mechanically operated valve. The first directional control valve may be a two port valve. The first directional control valve may include a first port and a second port to be selectively opened and closed.

The hydraulic accumulator is discharged in the discharging phase to power the hydraulic motor, during the high pressure sequence through a second directional control valve. The second directional control valve may include a solenoid operated valve or a mechanically operated valve. The second directional control valve may be a two port valve and include a first port and a second port to be selectively opened and closed.

The first directional control valve may be open during at least a part of one of the low pressure sequences for charging the hydraulic accumulator while the second directional control valve is closed during part of the low pressure sequence.

The second directional control valve is open during at least a part of the high pressure sequence for powering the hydraulic motor. The first directional control valve is closed during the part of the high pressure sequence.

The control means is configured to selectively actuate the first directional control valve and the second directional control valve in the charging phase and the discharging phase respectively, corresponding to at least one of the bale formation cycle parameters. The control means receive signals from at least one sensor for detecting the bale formation cycle parameters.

As described above, the auxiliary power source may be supplied with power by a power storage source, wherein the auxiliary power source may alternatively be an electric motor powered by an electric source. The electric source may be a battery or a generator, which are placed within the baler or the towing vehicle. The electric power source may be replaceable. The electric source may be rechargeable intermittently or during an electric charging phase.

The electric source powers the electric motor during the high pressure sequence.

The control means is configured to actuate and de-actuate the electric motor in the high pressure sequence and the low pressure sequence respectively, corresponding to at least one of the bale formation cycle parameters. The control means is at least one of a manual control system or electronic control system. When the control means is an electronic control system, the control means includes at least one sensor adapted to sense the bale formation cycle parameters.

The sensor is at least one of an angle sensor, a distance sensor, a proximity sensor and a time sensor. The control means includes a controller and a processor to process the inputs from the sensors. When the control means is a manual control system, the control means is controlled by an operator based on at least one user defined parameter which may be input by the operator through an user interface.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
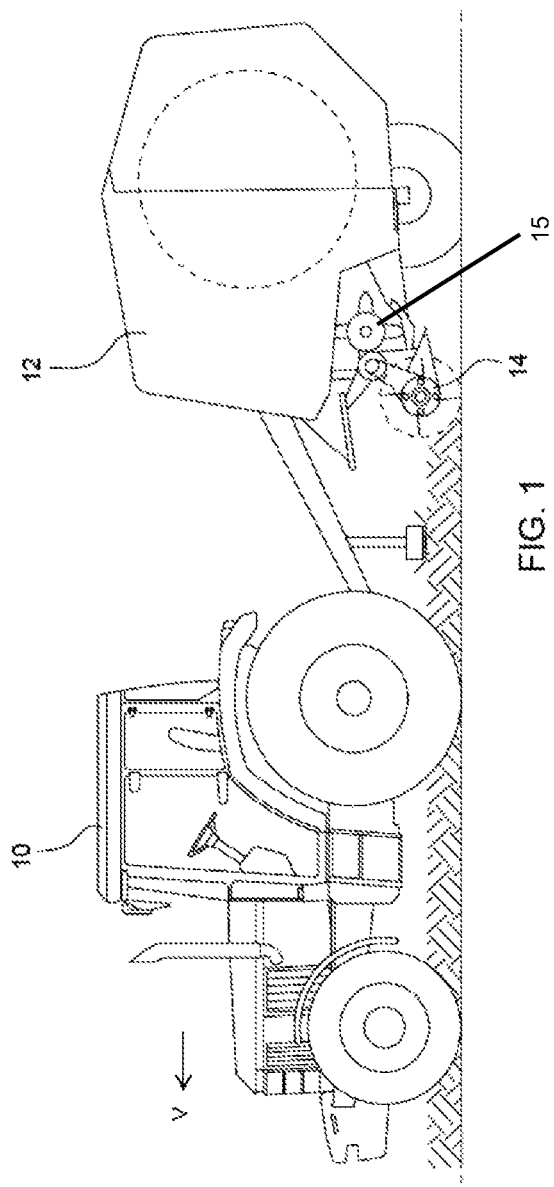
FIG. 1 is a side view of a round baler towed by a tractor.
Figure 2:
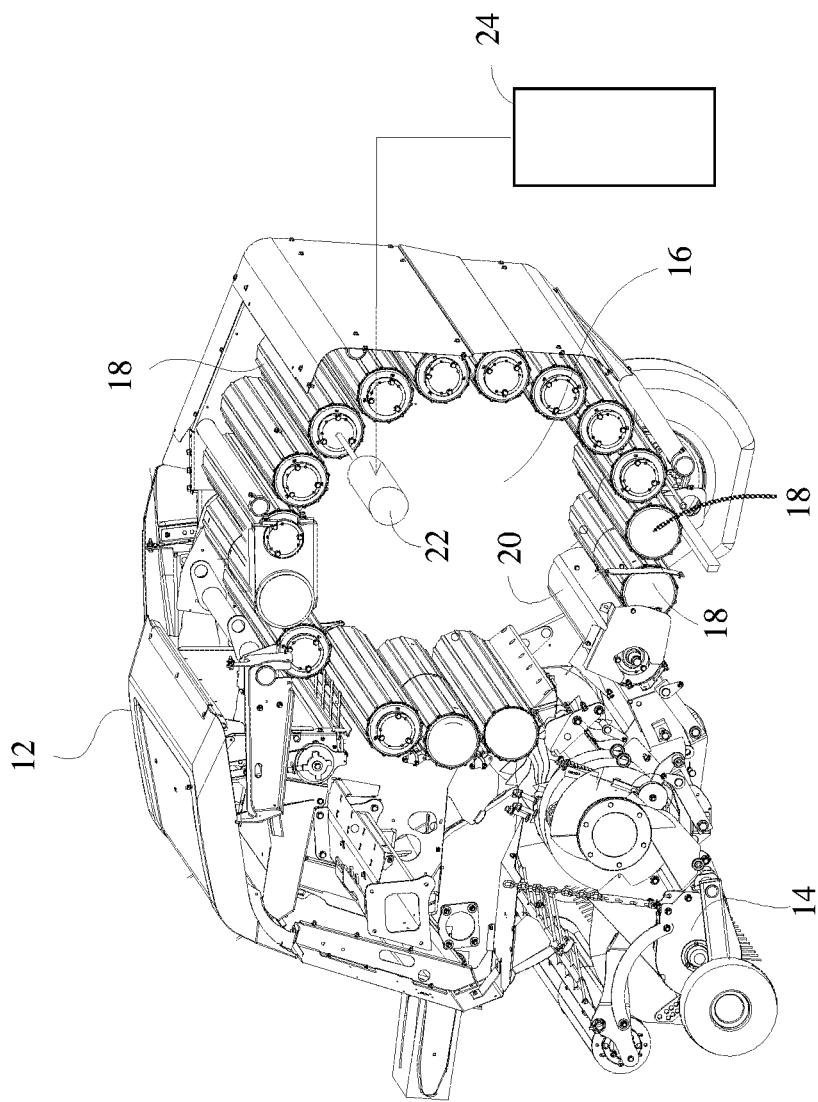
FIG. 2 is a sectional view of the round baler of FIG. 1 with a plurality of press rolls and an auxiliary power source.

Referring to FIG. 1 and FIG. 2, a tractor (10) is used to tow a round baler (12) along the forward towing direction (V). Hereinafter, all indicated directions and location of the round baler (12), such as, forward, backward, rear, front, up, above, down, left and right shall be determined with reference to the forward towing direction (V) of the round baler (12) in the field. The round baler (12) includes a pick-up unit (14) and a feeding system (15) provided at the front end of the round baler (12) to collect the residual product, such as hay and forage, from the ground and convey it into the baling chamber (16). The round baler (12) is mounted on a support frame of a chassis and includes the baling chamber (16) with a plurality of press rolls (18).

The round baler (12) is powered by a Power Take-off (PTO) shaft (not shown) of the tractor (10). The PTO shaft transmits a constant power from the engine for operating a press means. The press means may alternatively be referred to as a press. The press means may be belt, chain or press rolls. FIG. 2 illustrates the press means as press rolls (18). A plurality of press rolls (18) are arranged to defined the bale chamber (16) of the round baler (12). Each of the press rolls (18) is configured to rotate about their respective axis. The rotation of the press rolls (18) helps in bringing together the residual product, thereby enabling formation of bales. The driving bars (20) mounted on the press rolls (18) help in further agitating the residual product for efficient formation of a bale during a bale formation cycle. Although not illustrated, the press means may include press belts defining the baling chamber of a variable chamber baler.

Figure 3:
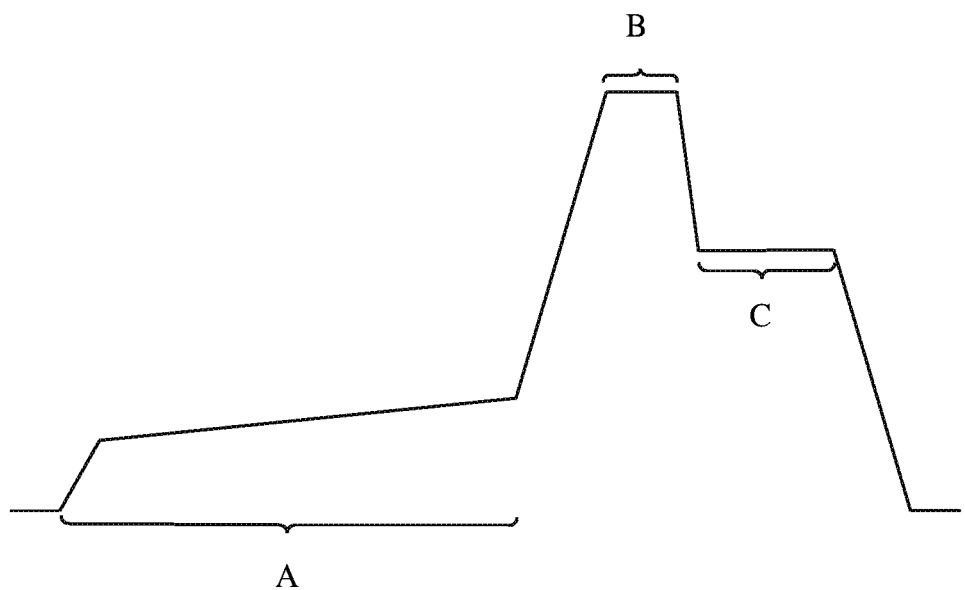
FIG. 3 is a diagram of a bale formation cycle.

The bale formation cycle, illustrated in FIG. 3, includes a sequence of a low pressure sequence (A), a high pressure sequence (B) and a bale tying sequence (C). In the low pressure sequence (A), the residual product starts to enter the baling chamber (16) and the formation of the bale initiates. The low pressure sequence (A) continues until the bale chamber (16) is filled completely with the residue product by the feeding system (15). In the low pressure sequence (A), the power supplied by the PTO shaft is sufficient to effectively drive the press rolls (18) to apply the required pressing effect. After the end of the low pressure sequence (A), the high pressure sequence (B) is initiated.

When the residue crop continues to be fed into the baling chamber (16) towards the end of the low pressure sequence (A), the baling chamber reaches its full capacity and the high pressure sequence (B) will momentarily be initiated with increasing density of the bale. Thus, in the high pressure sequence (B), the power demand momentarily reaches a peak value. The power supplied by the PTO shaft is not sufficient to provide this additional power requirement for effective bale forming.

In the period of high power requirement, in conventional balers known in the prior art, the operator may be required to slow down the speed of the tractor (10) in the forward towing direction (V) so that a significant portion of the engine power is directed towards the PTO shaft for delivering the higher power demand in the high pressure sequence (B). As an alternate to slowing the speed of the tractor (10) to cater to the increase power demand, the present disclosure provides for an auxiliary power source (22), powered by energy from a power storage source (24), for supplying the additional power required during the high pressure sequence (B). The additional power may also be required when there is a plugging at the feeding point of the baler for feeding residue material inside the baling chamber (16).

Figure 4:
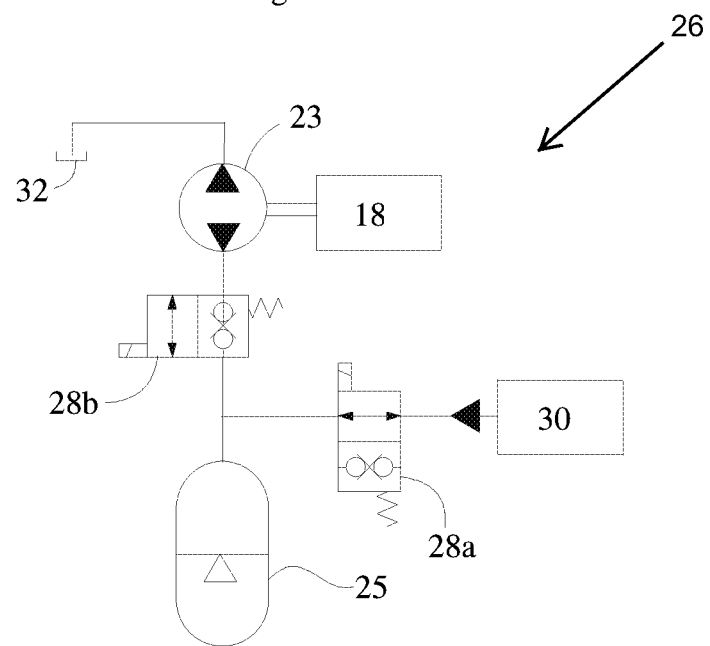
FIG. 4 is a schematic of a hydraulic arrangement for operating the auxiliary power source of FIG. 2.

In one embodiment, as illustrated in FIG. 2 and FIG. 4, the auxiliary power source (22) is a hydraulic motor (23) powered by the power storage source (24) which is a hydraulic accumulator (25). FIG. 4 particularly illustrates the hydraulic circuit for operation of the hydraulic motor (23) and the hydraulic accumulator (25) in the low pressure sequence and the high pressure sequence. Alternatively, the auxiliary power source (22) is an electric motor powered by the power storage source (24) which is an electric source. The electric source may be a battery or a generator. The electric power source may be replaceable. Alternatively, the electric source may be rechargeable intermittently or charged during an electric charging phase. The electric source powers the electric motor during the high pressure sequence.

FIG. 4 schematically illustrates a hydraulic circuit (26) with the hydraulic motor (23), the hydraulic accumulator (25), a first directional control valve (28a) and a second directional control valve (28b). The hydraulic motor (23) is selectively powered by the hydraulic accumulator (25). The hydraulic accumulator (25) is connectable to a hydraulic pump (30) and the hydraulic motor (23). The hydraulic accumulator (25) is operable in a charging phase and a discharging phase. The fluid required to charge the hydraulic accumulator (25) may be supplied by a fluid reservoir (32). The hydraulic accumulator (25) is charged in the charging phase by the hydraulic pump (30), during the low pressure sequence A and the bale tying sequence (C). The first directional control valve (28a) provides a fluid communication between the hydraulic pump (30) and the accumulator (25) in the charging phase. The first directional controlled valve (28a) is a solenoid operated valve or mechanically operated valve. The first directional control valve (28a) is a two port valve. The first directional control valve (28a) is open during at least a part of the low pressure sequence (A) for charging the hydraulic accumulator (25) while the second directional control valve (28b) is closed during the part of the low pressure sequence (A). Alternatively, the first directional control valve (A) is open during the normal feeding of the crop residues into the baling chamber (16).

The hydraulic accumulator (25) is discharged in the discharging phase to power the hydraulic motor (23), during the high pressure sequence (B) through a second directional control valve (28b). The second directional controlled valve (28b) is a solenoid operated valve or a mechanically operated valve. The second directional control valve (28b) is a two port valve. The second directional control valve (28b) is open during at least a portion of the high pressure sequence for powering the hydraulic motor (23). The first directional control valve (28a) is closed during the portion of the high pressure sequence (B). Alternatively, the second directional control valve (28b) is open when plugging is developed at the feeding point of the crop residues into the baling chamber (16).

The sequential switching of the hydraulic accumulator (25) between a charging phase and a discharging phase is controlled by a control means (not shown) based on bale formation cycle parameters. The control means may alternatively be referred to as a controller. The bale formation parameters include the instant of an end of the low pressure sequence (A) or a beginning of the high pressure sequence (B). This is an instant of time between the low pressure sequence (A) and the high pressure sequence (B). This may also be the instant of time when a plugging is developed at the feeding point of the baler and there is a high power demand to clear the residue material. The bale formation cycle parameters may further include one or more of a cycle time, an instant of the cycle time, pressure on the press means (18), bale density, crop inflow, gate movement, crop parameter, bale dimension and a user defined input.

The bale formation cycle parameters are detected by at least one sensor (not shown) which can be associated with different parts of the baler (12). The sensor (not shown) may provide sensed signals from different parts of the baler (12) and transmit the same to the control means (not shown). As the control means (not shown) receives the sensed signals, it determine whether the baler (12) is operating in the low pressure sequence (A), the high pressure sequence (B) or the bale tying sequence (C). If the control means (not shown) determines that the baler (12) is operating in the low pressure sequence (A) or in the bale tying sequence (C), the control means may trigger the first directional control valve (28a) to open, thereby allowing a flow of a hydraulic fluid from the hydraulic pump (30) to pressurize the hydraulic accumulator (25). Simultaneously, the control means ensures that the second directional control valve is in closed configuration.

On the other hand, if the control means (not shown) determines from the sensed signals that high power is required during the bale formation cycle, e.g., when the baler (12) operates in the high pressure sequence (B), the control means triggers the first directional control valve (28a) to close while the second directional control valve (28b) is opened for transmitting the hydraulic fluid, under pressure, from the hydraulic accumulator (25) to operate the hydraulic motor (23) for supplying additional power required during the high pressure sequence (B). This helps in providing sufficient power for efficiently operating the baler (12) during the high pressure sequence (B) without compromising on the forward speed of the baler (12) in the forward towing direction (V).

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A baler for forming a pressed bale, comprising:
  a baling chamber;
  a press mounted within the baling chamber, the press operable in a bale formation cycle, where the bale formation cycle comprises bale formation cycle parameters;
  wherein the bale formation cycle includes a low pressure sequence in a first portion of the bale formation cycle and a high pressure sequence in a second portion of the baling formation cycle;
  a primary power source operably coupled with the press to transmit a power to the press;
  an auxiliary power source coupled to the press, the auxiliary power source being operable in a power transmitting mode to transmit an auxiliary power to the press;
  wherein the auxiliary power source includes a hydraulic motor operably powered by a hydraulic source;
  wherein the hydraulic source includes a hydraulic accumulator fluidly coupled to a hydraulic pump and the hydraulic motor, the hydraulic accumulator being operable in a charging phase and a discharging phase;
  wherein the hydraulic accumulator is charged in the charging phase by the hydraulic pump and during the low pressure sequence via a first directional control valve;
  a controller electrically coupled to the auxiliary power source, the controller configured for controlling operation of the auxiliary power source; and
  wherein, the operation of the auxiliary power source is operably controlled manually or by the controller according to the bale formation cycle parameters.

2. The baler of claim 1, wherein the bale formation cycle parameters comprise an end of the low pressure sequence or a beginning of the high pressure sequence.

3. The baler of claim 1, wherein the bale formation cycle parameters include one or more of a cycle time, an instant of the cycle time, pressure on the press, bale density, crop inflow, gate movement, crop parameter, bale dimension and user defined input.

4. The baler of claim 1, wherein the press comprises a belt, a chain or rolls.

5. The baler of claim 1, wherein the hydraulic accumulator is discharged in the discharging phase to power the hydraulic motor and during the high pressure sequence via a second directional control valve.

6. The baler of claim 5, wherein the first directional control valve is in an open position during at least a portion of the low pressure sequence for charging the hydraulic accumulator and the second directional control valve is in a closed position during the portion of the low pressure sequence.

7. The baler of claim 5, wherein the second directional control valve is in an open position during at least a portion of the high pressure sequence for powering the hydraulic motor and the first directional control valve is in a closed position during the portion of the high pressure sequence.

8. The baler of claim 5, wherein the controller is configured to selectively actuate the first directional control valve and the second directional control valve in the charging phase and the discharging phase respectively.

9. A round baler for forming a pressed bale, comprising:
a baling chamber;
a press mounted within the baling chamber, the press being operable in a bale formation cycle, where the bale formation cycle comprises bale formation cycle parameters;
a primary power source operably coupled with the press to transmit a power to the press;
an auxiliary power source coupled to the press, the auxiliary power source being operable in a power transmitting mode to transmit an auxiliary power to the press;
wherein the auxiliary power source includes a hydraulic motor operably powered by a hydraulic source;
wherein the hydraulic source includes a hydraulic accumulator fluidly coupled to a hydraulic pump and the hydraulic motor, the hydraulic accumulator being operable in a charging phase and a discharging phase;
wherein the hydraulic accumulator is charged in the charging phase by the hydraulic pump and during a low pressure sequence of the bale formation cycle via a first directional control valve;
wherein the hydraulic accumulator is discharged in the discharging phase to power the hydraulic motor and during a high pressure sequence of the bale formation cycle via a second directional control valve;
a controller electrically coupled to the auxiliary power source, the controller configured for controlling operation of the auxiliary power source;
wherein, the operation of the auxiliary power source is operably controlled manually or by the controller according to the bale formation cycle parameters; and
wherein the bale formation cycle comprises a low pressure sequence in a first portion of the bale formation cycle and a high pressure sequence in a second portion of the baling formation cycle.

10. A baler for forming a pressed bale, comprising:
a baling chamber;
a press means mounted within the baling chamber, the press means being operable in a bale formation cycle, where the bale formation cycle comprises bale formation cycle parameters;
a primary power source operably coupled with the press means to transmit a power to the press means;
an auxiliary power source coupled to the press means, the auxiliary power source being operable in a power transmitting mode to transmit an auxiliary power to the press means;
a control means electrically coupled to the auxiliary power source, the control means configured for controlling operation of the auxiliary power source;
a hydraulic accumulator fluidly coupled to a hydraulic pump and the auxiliary power source, the hydraulic accumulator being operable in a charging phase and a discharging phase;
a first directional control valve and a second directional control valve;
wherein, the operation of the auxiliary power source is operably controlled manually or by the control means according to the bale formation cycle parameters.

11. The baler of claim 10, wherein:
the hydraulic accumulator is charged in the charging phase by the hydraulic pump and during a low pressure sequence via the first directional control valve; and
the hydraulic accumulator is discharged in the discharging phase to power the hydraulic motor and during a high pressure sequence via the second directional control valve.

* * * * *